US011779991B2

(12) United States Patent
Pearl, II et al.

(10) Patent No.: US 11,779,991 B2
(45) Date of Patent: Oct. 10, 2023

(54) FLARING TOOL AND METHOD OF FLARING A TUBE OR THE LIKE

(71) Applicant: Uniweld Products, Inc., Fort Lauderdale, FL (US)

(72) Inventors: David S. Pearl, II, Fort Lauderdale, FL (US); Robert L. Latham, Tamarac, FL (US)

(73) Assignee: Uniweld Products, Inc., Fort Lauderdale, FL (US)

( * ) Notice: Subject to any disclaimer, the term of this patent is extended or adjusted under 35 U.S.C. 154(b) by 242 days.

(21) Appl. No.: 17/293,245

(22) PCT Filed: Nov. 20, 2019

(86) PCT No.: PCT/US2019/062325
§ 371 (c)(1),
(2) Date: May 12, 2021

(87) PCT Pub. No.: WO2020/123108
PCT Pub. Date: Jun. 18, 2020

(65) Prior Publication Data
US 2021/0402457 A1 Dec. 30, 2021

Related U.S. Application Data

(60) Provisional application No. 62/777,300, filed on Dec. 10, 2018.

(51) Int. Cl.
*B21D 41/02* (2006.01)
*F16D 7/04* (2006.01)

(52) U.S. Cl.
CPC .......... *B21D 41/021* (2013.01); *F16D 7/044* (2013.01)

(58) Field of Classification Search
CPC ...... B21D 19/00; B21D 19/046; B21D 39/08; B21D 39/10; B21D 39/12; B21D 41/02; B21D 41/021
See application file for complete search history.

(56) References Cited

U.S. PATENT DOCUMENTS 2,711,771 A * 6/1955 Wilson ................ B21D 41/023
72/126
2,893,464 A 7/1959 Franck
(Continued)

FOREIGN PATENT DOCUMENTS

| CA | 2807293 A1 | 11/2017 | |
|----|------------|---------|---|
| FR | 2660219 A * | 10/1991 | ........... B21D 19/046 |
| JP | 2006-26700 A | 2/2006 | |

OTHER PUBLICATIONS

Badoureaux, translation of FR-2660219 (Year: 1991).*
International Search Report and Written Opinion dated Jan. 22, 2021 in corresponding PCT application No. PCT/US2019/062325.

*Primary Examiner* — Bobby Yeonjin Kim
(74) *Attorney, Agent, or Firm* — NIELDS, LEMACK & FRAME, LLC (57) ABSTRACT

Tube flaring tool comprising a tube receiving region comprising first and second gripping dies retractable with respect to each other and positionable to cooperatively define an opening for receiving a tube; a first clutch shaft; a support housing having a bore for receiving a second clutch shaft; a clutch plate; a flare forming head operable to flare the free end of the tube; and a biasing member urging the flare forming head axially. The first clutch shaft may have an outer configuration adapted to be engaged by a 12 point or ⅜" square drive SAE ratchet wrench for creating mechanical advantage to actuate the flare forming head. When the force that the biasing member urges the flare forming head axially is overcome, the clutch plate disengages from the (Continued)

second clutch shaft such that further actuation of the first clutch shaft does not rotate the flare forming head shaft, preventing over-flaring.

9 Claims, 10 Drawing Sheets

(56) References Cited

U.S. PATENT DOCUMENTS

| | | | |
|---|---|---|---|
| 2,907,370 A * | 10/1959 | Wilson | B21D 41/021 |
| | | | 269/319 |
| 3,011,539 A | 12/1961 | Henrickson | |
| 3,040,800 A | 6/1962 | Hartley | |
| 3,209,571 A | 10/1965 | Wilson | |
| 3,888,102 A | 6/1975 | Nigido | |
| 3,934,325 A | 1/1976 | Jaffe | |
| 4,494,398 A | 1/1985 | Svoboda | |
| 4,831,855 A | 5/1989 | Wagner | |
| 6,199,421 B1 * | 3/2001 | Ploeger | B21D 41/021 |
| | | | 72/317 |
| 9,302,313 B2 * | 4/2016 | Lin | B21D 41/021 |
| 9,492,857 B2 | 11/2016 | Hasenberg et al. | |
| 9,981,301 B1 * | 5/2018 | Huang | B21D 39/06 |
| 9,987,672 B2 | 6/2018 | Houle et al. | |
| 10,870,142 B2 | 12/2020 | Houle et al. | |
| 11,351,594 B2 | 6/2022 | Houle et al. | |
| 2006/0243019 A1 | 11/2006 | Shafer et al. | |
| 2011/0192207 A1 * | 8/2011 | Huang | B21D 41/021 |
| | | | 72/120 |
| 2012/0261323 A1 * | 10/2012 | Badeau | B01D 27/08 |
| | | | 210/232 |
| 2018/0099326 A1 * | 4/2018 | Jarvis | F16D 7/044 |

* cited by examiner

FLARING TOOL AND METHOD OF FLARING A TUBE OR THE LIKE

This application claims priority of U.S. Provisional Application Ser. No. 62/777,300 filed Dec. 10, 2018, the disclosure of which is incorporated herein by reference in its entirety.

BACKGROUND

It is often necessary to connect malleable conduits or tubing to other conduits or tubing, or to fixtures, for example. This may require at one of the free ends of the tubing be expanded, so that an appropriate coupling or seal can be made. To that end, tube expanding or flaring tools have been developed that are used to deform the malleable metal tube end. Conventionally, such tools include a cone-shaped member that is introduced into the free end of the tube to be expanded, while using a die placed around the outer portion of the tube end. Penetration of the cone-shaped member into the tube results in the expanding of the Lube. Tubes with radially outwardly flared flanges thus may be provided.

Often such tools are used in confined spaces, and access to the actuating mechanism to cause the flaring member to contact the tube to be flared and expand the tube is awkward or encumbered. In addition, inconsistent flares, or rough flares with burrs often result from use of the conventional tools that are currently commercially available on the market.

Accordingly, it would be desirable to provide a flaring tool and method of flaring a malleable tube or the like that can be used in confined spaces, that results in a consistent and smooth flare, and that is easy to use.

SUMMARY

Problems of the prior art have been addressed by the embodiments disclosed herein, which in certain embodiments provide a manually or hand-held and hand operable flaring or expanding tool, and a method of flaring or expanding a malleable tube, pipe, conduit or the like, such as copper pipe. In certain embodiments, the tool expands a free end of a tube cylindrically radially outwardly relative to the longitudinal centerline of the tube. In certain embodiments, the expanding tool includes a ratchet assembly for actuating a flare forming head. In certain embodiments a height guide is provided for accurate positioning of the tube to be flared in the tool. In certain embodiments a clutch assembly is provided for preventing over-expansion of the tube.

In an exemplary embodiment, disclosed is a tool for flaring the free end of a tube, the tool comprising: a tube receiving region comprising first and second gripping dies retractable with respect to each other and positionable in the tool to cooperatively define an opening for receiving a tube and securing the tube against axial movement in the tool; a support housing having an internal bore for receiving a first clutch shaft which may be a slotted clutch shaft; a second clutch shaft which may be a threaded. clutch shaft; a clutch plate providing a drive interface between the first clutch shaft and the second clutch shaft; a flare forming head operable to flare the free end of the tube, the flare forming head having a flare forming head shaft coupled to the first clutch shaft and rotatable in the support housing by actuation of the first clutch shaft; a biasing member urging the flare forming head axially towards the secured tube; wherein the first clutch shaft has an outer configuration adapted to be engaged by a wrench or ratchet wrench, such as a 6 point, 12 point or ⅜" square drive ratchet wrench for creating mechanical advantage to actuate the flare forming head; and wherein when the force that the biasing member urges the flare forming head axially is overcome, the clutch plate completely disengages from the second clutch shaft such that further actuation of the first clutch shaft does not rotate the flare forming head shaft.

In a first aspect of the exemplary embodiment, the flare forming head reciprocates in the tool.

In a second aspect of the exemplary embodiment, the first and second gripping dies are rotatable in the tube receiving region so as to cooperatively define openings of different diameters. The tool can thus accommodate tubes of different diameters to flare.

In third aspect of the exemplary embodiment, a height guide positioned in the tool and is actuatable between a first position in which it creates a physical stop for axial insertion of the tube in the opening, and a second position in which it is retracted from the opening.

In a fourth aspect of the exemplary embodiment, the first and second gripping dies comprise beveled regions providing an angled flaring surface defining a radial outward taper against which the flare of the tube is formed.

In a fifth aspect of the exemplary embodiment, the first gripping die has at least one semi-circular recess in its outer perimeter that cooperates with a corresponding semi-circular recess in outer perimeter of the second griping die to form a cylindrical opening for receiving tube to be flared.

In a sixth aspect of the exemplary embodiment, the first gripping die has a plurality of semi-circular recesses in its outer perimeter having different radiuses, the second gripping die has a plurality of semi-circular recesses in its outer perimeter having different radiuses, each corresponding to a respective radius of the recesses of the first gripping die, and wherein the first and second gripping dies are rotatable in the receiving region to position semi-circular recesses or the same radius on each gripping die to cooperatively form the cylindrical opening for receiving the tube to be flared.

In a seventh aspect of the exemplary embodiment, the clutch plate comprises an axially extending angled arm, and the second clutch shaft comprises a radial slot for receiving the axially extending angled arm. When the force of the biasing member is overcome, the axially extending angled arm is forced out of the radial slot so that the second clutch shaft is no longer driven when the first clutch shaft is actuated.

In an eighth aspect of the exemplary embodiment, the first clutch shaft may have a first female region such as a first slot configured to receive a first male protrusion on the clutch plate, the first male protrusion extending axially on the clutch plate; and the second clutch shaft may be threaded and may include a second female region such as a second slot configured to receive a second male protrusion on the clutch plate, the second male protrusion extending axially on the clutch plate in a direction opposite the first male protrusion.

In its method aspects, embodiments disclosed herein include manually operating a flaring tool by actuating the tool to cause a flare forming head to engage the tube and expand the same radially outward.

In an exemplary embodiment, the method of flaring a free end of a tube comprises inserting a tube having a free end to be flared in an opening between two gripping dies in a hand-held flaring tool; securing the gripping dies in place in an operative position to grip the tube to prevent axial movement of the tube in the tool; manually actuating a first clutch shaft causing rotation thereof in a first direction, thereby rotating a flare forming head coupled to the first clutch shaft via a flare forming head shaft, thereby compressing a biasing member positioned about the flare forming head shaft to force the flare forming head to translate axially towards the tube to engage the free end of the tube with sufficient force to flare the free end radially outwardly; continuing the actuation until first force to continue the axial displacement of the flare forming head into the tube exceeds the force of the biasing member urging the flare forming head towards tube; whereby further rotation of the first shaft in the first direction no longer causes axial displacement of the flare forming head towards the tube.

In one aspect of the exemplary embodiment of the method, a height guide is positioned axially above the opening between the two gripping dies to provide a physical stop to the extent to which the tube can be axially inserted into the opening.

In another aspect the tube to be flared has a longitudinal axis, and the flare forming member rotates acentrically relative to that longitudinal axis.

For a better understanding of the embodiments disclosed herein, reference is made to the accompanying drawings and description forming a part of this disclosure.

BRIEF DESCRIPTION OF THE DRAWINGS

The embodiments disclosed herein may take form in various components and arrangements of components, and in various process operations and arrangements of process operations. The drawings are for purposes of illustrating preferred embodiments. This disclosure includes the following drawings.

BRIEF DESCRIPTION OF THE DRAWINGS

DETAILED DESCRIPTION

A more complete understanding of the components, processes and apparatuses disclosed herein can be obtained by reference to the accompanying drawings. The figures are merely schematic representations based on convenience and the ease of demonstrating the present disclosure, and is, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawing, and are not intended to define or limit the scope of the disclosure. In the drawing and the following description below, it is to be understood that like numeric designations refer to components of like function.

The singular forms "a," "an," and "the" include plural referents unless the context clearly dictates otherwise.

As used in the specification, various devices and parts may be described as "comprising" other components. The terms "comprise(s)," "include(s)," "having," "has," "can," "contain(s)," and variants thereof, as used herein, are intended to be open-ended transitional phrases, terms, or words that do not preclude the possibility of additional components.

It should be noted that many of the terms used herein are relative terms. For example, the terms "upper" and "lower" are relative to each other in location, i.e. an upper component is located at a higher elevation than a lower component, and should not be construed as requiring a particular orientation or location of the structure.

The terms "top" and "bottom" are relative to an absolute reference, i.e. the surface of the earth. Put another way, a top location is always located at a higher elevation than a bottom location, toward the surface of the earth.

Figure 1:
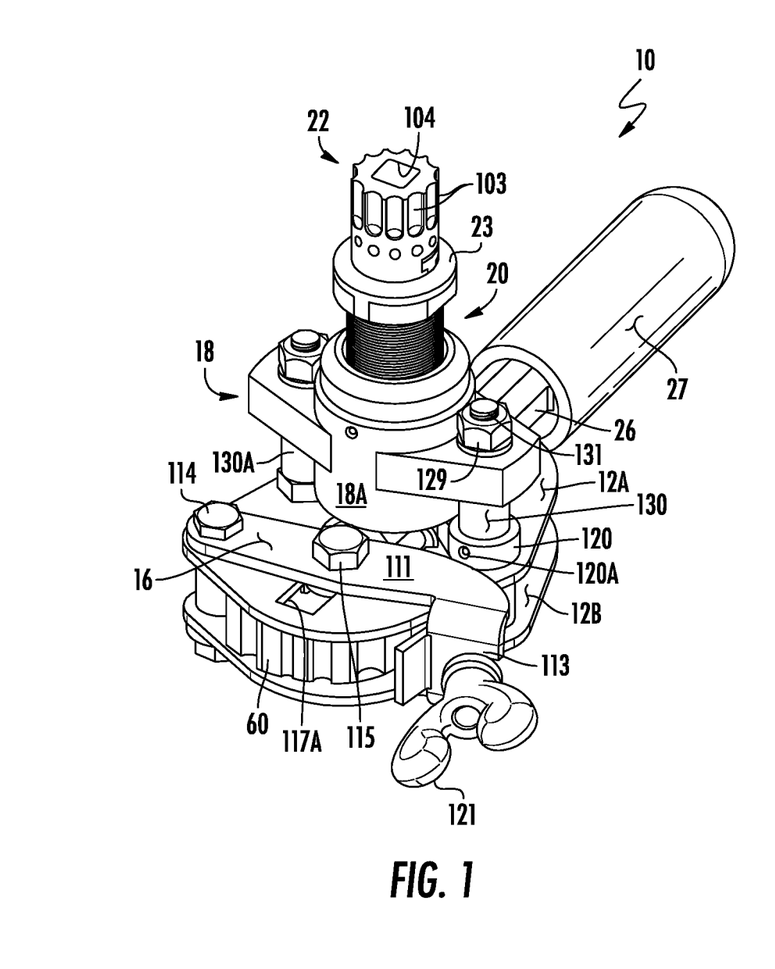
FIG. 1 is a perspective view of a flaring tool shown in the closed position in accordance with certain embodiments.
Figure 2:
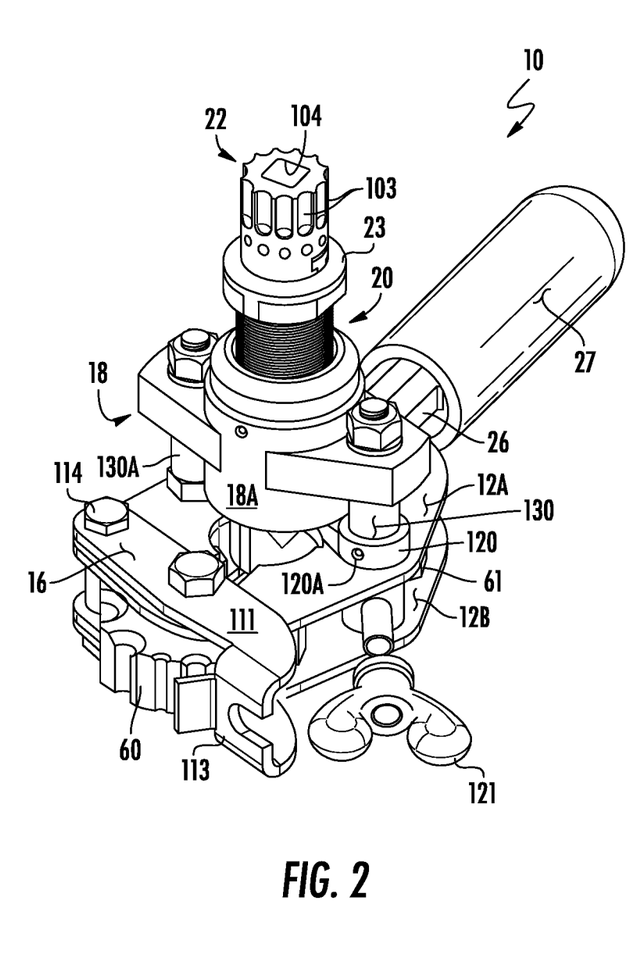
FIG. 2 is a perspective view of a flaring tool shown in the open position in accordance with certain embodiments.
Figures 3A, 3B:
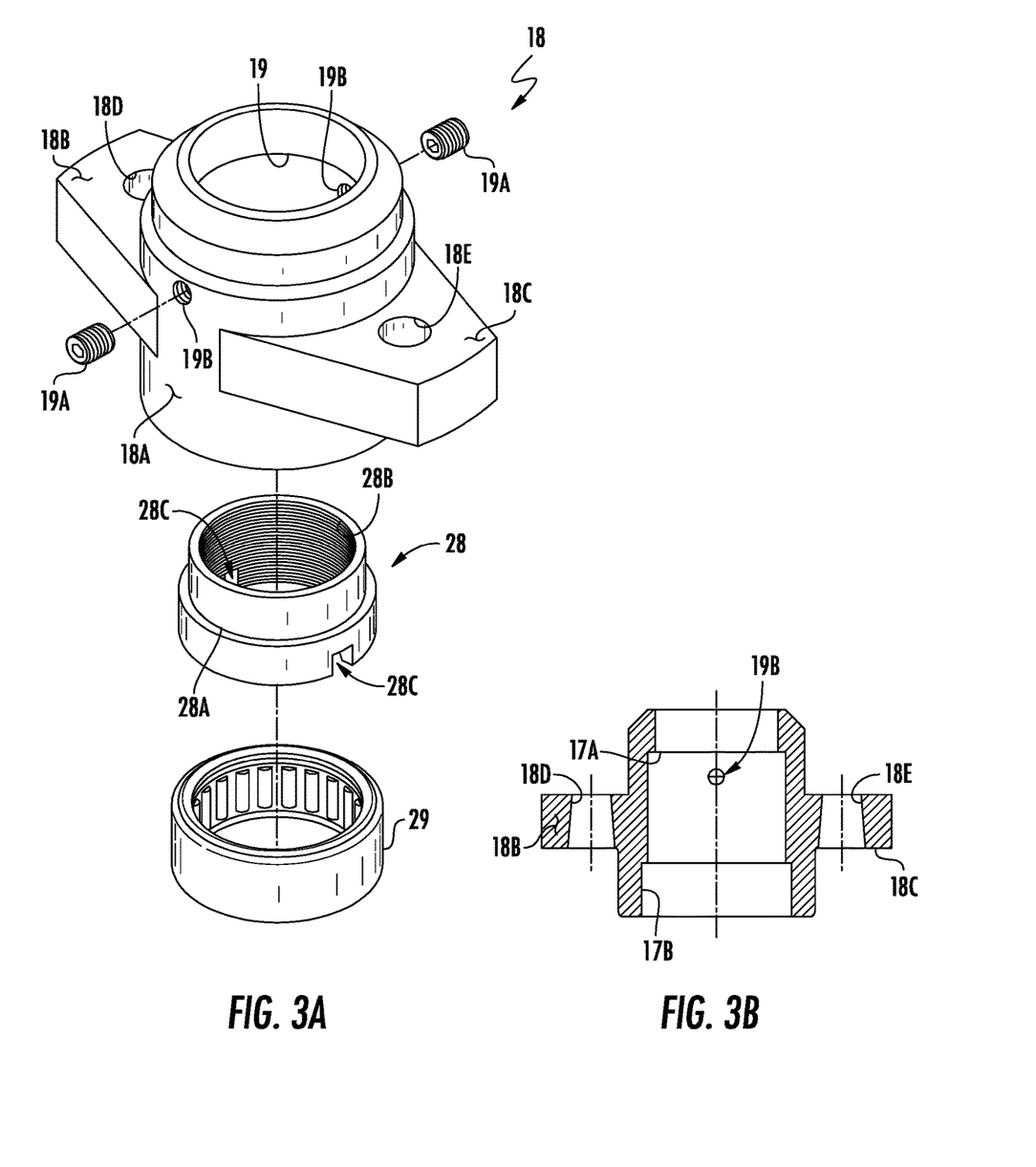
FIG. 3A is an exploded view of a support housing assembly in accordance with certain embodiments.
FIG. 3B a cross-sectional view of a support housing in accordance with certain embodiments.

Turning now to FIGS. 1, and 2, there is shown a flaring tool 10 in accordance with certain embodiments. In certain embodiments, the tool 10 includes spaced top and bottom plates 12A, 12B that define a tube receiving region and receive flaring or gripping jaws or dies 60, 61 (FIG. 6) that cooperate to grip or clamp a tube, pipe or the like (not shown) to be flared. In certain embodiments, the gripping dies 60, 61 (FIG. 6) cooperate to grip the tube, pipe or the like to prevent axial movement of the tube, pipe or the like in the tool 10 during a flaring operation. In certain embodiments, a locking bracket 16 (FIGS. 1 and 2) attaches to the top and bottom plates 12A, 12B, and may be pivoted between a closed position shown in FIG. 1 and an open position shown in FIG. 2 as discussed in further detail below. FIG. 3A shows a support housing 18 secures to the bottom plate 12B with shaft supports 130 and 130A and includes an internal bore 19 having internal threads or housing an annular insert 28 that has internal threads 28B that mate with corresponding external threads on a second clutch shaft 20 (FIGS. 1 and 2). A first clutch shaft 22 attaches to the second clutch shaft 20 such as via a clutch plate 23 that provides a drive interface between the first clutch shaft 22 and second clutch shaft 20. The clutch plate 23 is engageable and disengageable from the second clutch shaft to prevent overflaring of the tube. Offset handle 26 connects to top plate 12A and extends radially outwardly from the top plate 12A as shown, and can include a cushioned cover 27 providing a comfort grip for the user. The offset handle 26 is configured to improve balance, reduce stress, fatigue and positioned for the user of the tool to grasp and support the tool 10 for maximum leverage during a flaring operation.

Figure 8:
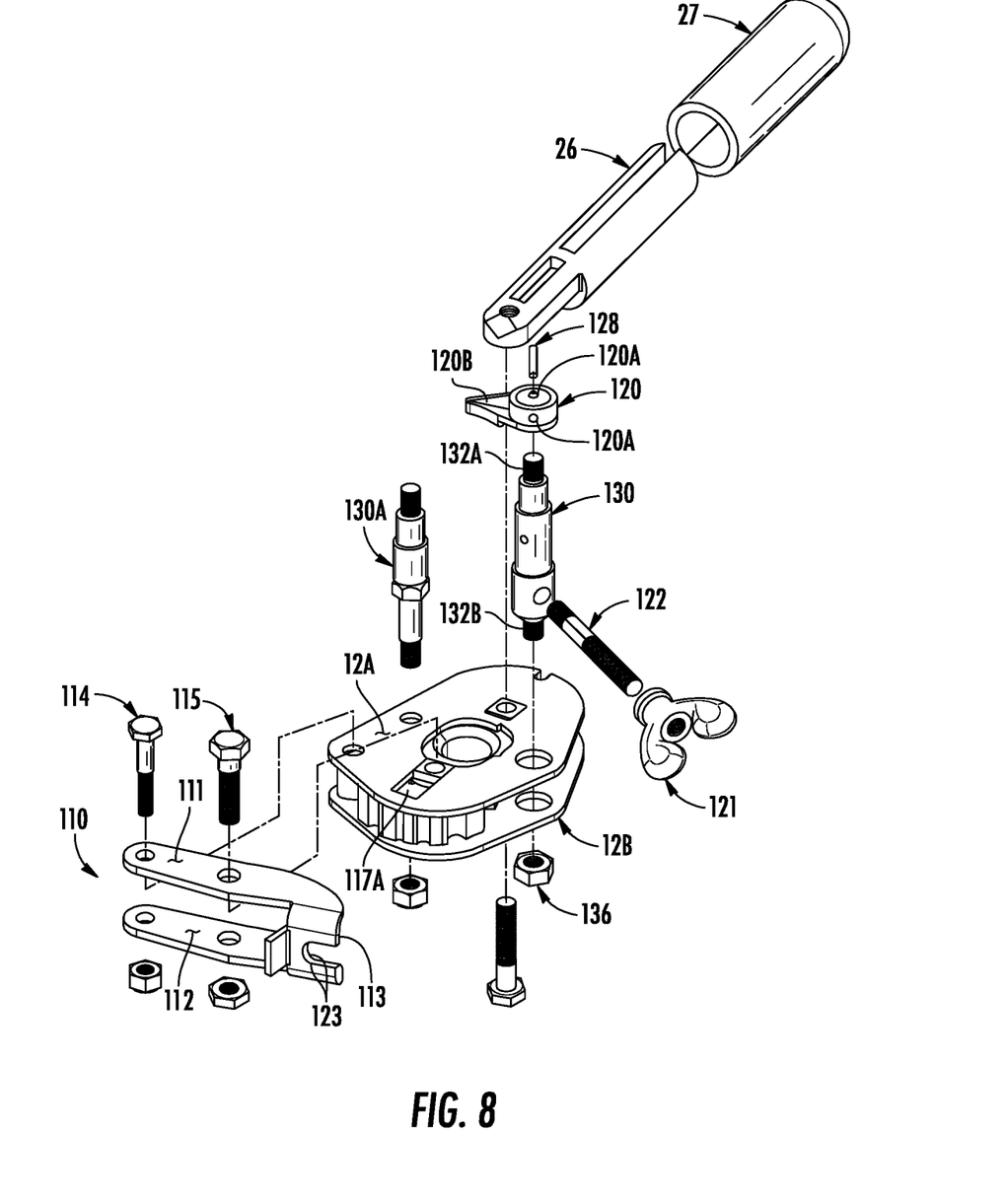
FIG. 8 is an exploded view of certain components of the flaring tool in accordance with certain embodiments.

FIGS. 3A, 3B, 4A and 4B illustrate the support housing 18 in accordance with certain embodiments. In the embodiment shown, the support housing 18 includes a central hub 18A that may be generally cylindrical with an internal bore 19 (FIG. 3A), and opposite wings 18B, 18C that extend radially outwardly from the central hub for securing the support housing 18 to the bottom plate 12B such as through respective through holes 18D, 18E in the wings 18B, 18C with suitable shaft supports 130, 130A (FIG. 8). In some embodiments, the internal bore 19 may be threaded, or may contain an annular or ring insert 28 that is threaded internally, as shown in FIG. 3A. The annular or ring insert 28 may have an annular flange 28A that abuts against a corresponding shoulder 17A (FIG. 3B) in the bore 19, and may be fixed in the bore 19 with one or more set screws 19A threaded in respective side holes 19B of the support housing 18 that are received by the notches 28C in the insert 28. An annular bearing support ring 29 is also positioned in the bore 19 of the support housing 18 and abuts against shoulder 17B. The bearing support ring 29 receives cylindrical member 131 and aligns the forming tool shaft 30 (FIG. 4B) inside the support housing 18 and allows it to rotate freely.

Figure 4A:
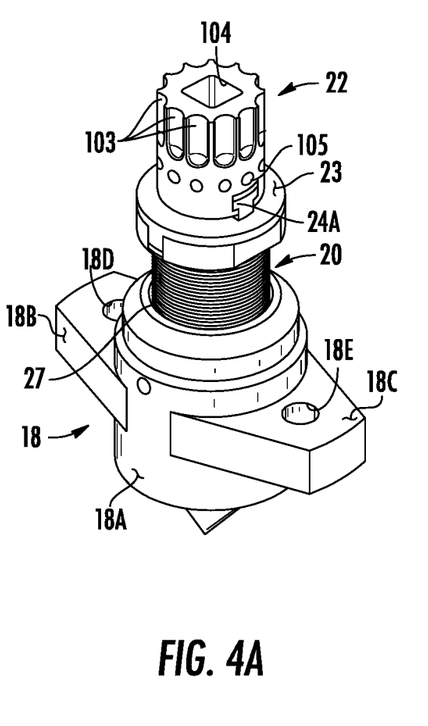
FIG. 4A is a perspective view of a support housing and first ratchet clutch assembly in accordance with certain embodiments.
Figure 4B:
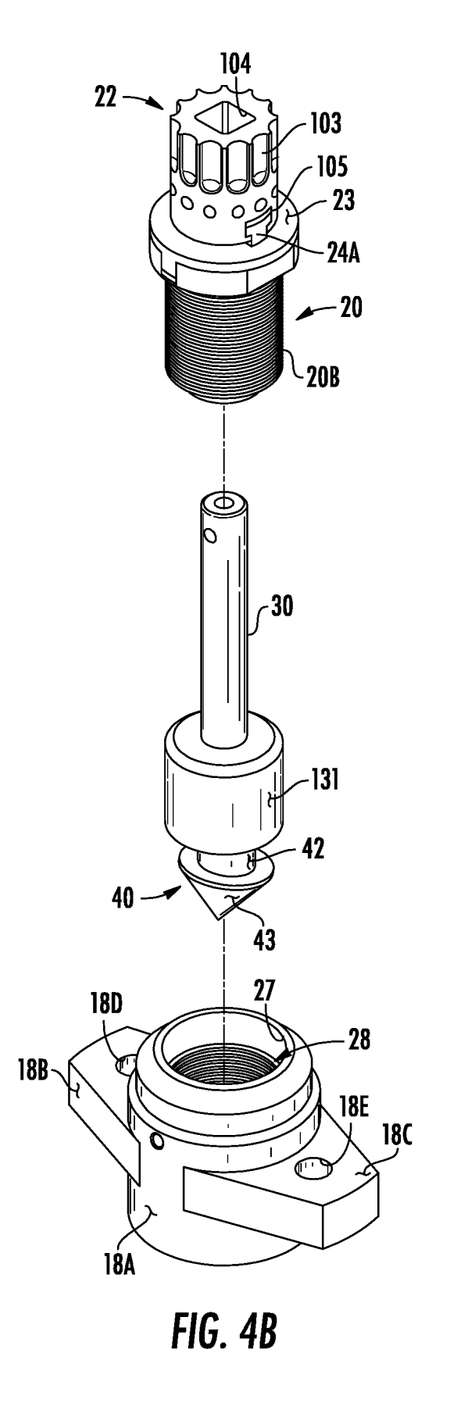
FIG. 4B is an exploded view of the support housing and ratchet clutch assembly of FIG. 4A.
Figure 5A:
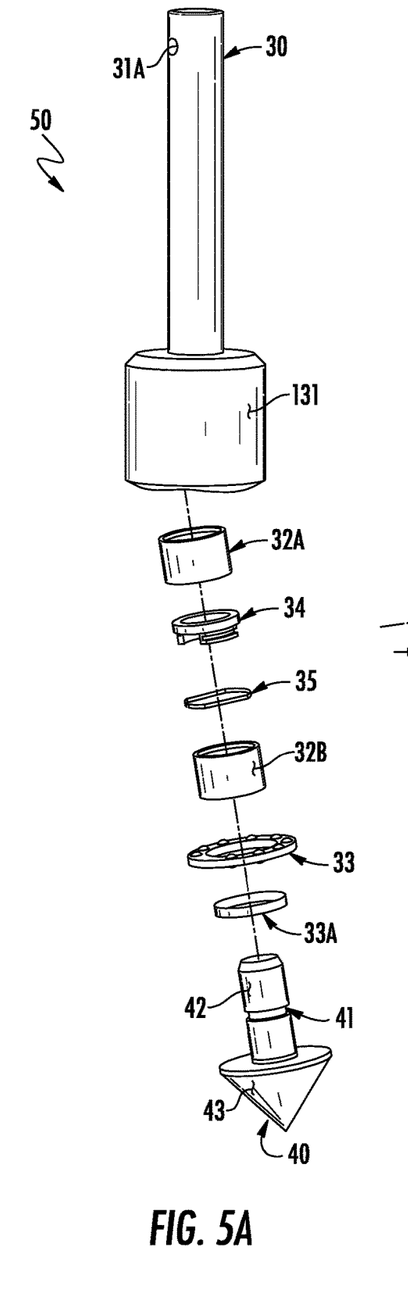
FIG. 5A is an exploded view of a forming tool support assembly in accordance with certain embodiments.
Figure 5B:
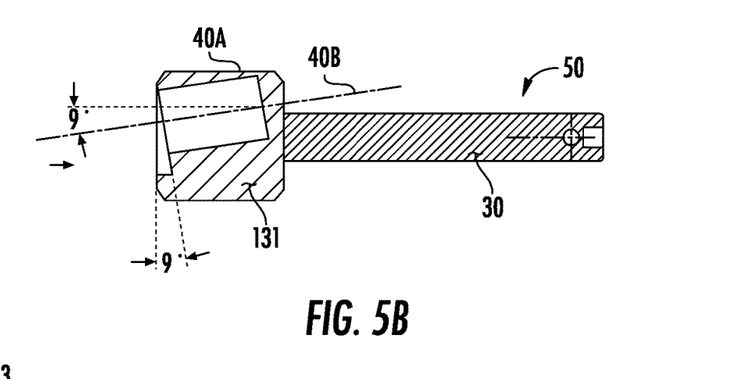
FIG. 5B a cross-sectional view or a forming tool support shaft in accordance with certain embodiments.

FIGS. 5A and 5B illustrate an embodiment of the forming tool support shaft assembly 50. In the embodiment shown, the assembly 50 includes elongated forming head support shaft 30, attached to or integrally formed with a cylindrical member 131 having an internal recess 40A configured to receive a portion of the flare forming head 40 and various bearings. FIG. 5B illustrates how in certain embodiments the internal recess 40A is offset relative to the vertical centerline of the cylindrical member 131. Thus, in some embodiments the longitudinal centerline 40B of the internal recess 40A may be offset from about 5 to about 15°, preferably 9°, from the longitudinal axis of the forming head support shaft 30, and results in acentric rotation of the forming head 40 about longitudinal centerline of the forming tool support shaft 30 when actuated. This acentric rotation of the flare forming head 40 facilitates burnishing of the flared end of the tube being flared.

In certain embodiments, the bearings may include one or more shaft bearings 32A, 32B (two shown and preferred), and a bearing ring 33 that may be accompanying by a bearing ring spacer 33A that ensures a snug fit between the bearing ring 33 and the stub 42 of the flare forming head 40. A retaining ring 34 may be provided that provides a point of attachment for retaining clip 35 that secures shaft bearing 32B, bearing ring 33, and bearing ring spacer 33A to the stub 42 between the annular groove 41 in stub 42 and the cone-shaped member 43. Annular groove 41 in stub 42 of the forming tool 40 receives the clip 35. Shaft bearing 32A is press fit in recess 40A in the cylinder member 131 and receive the stub and allows it to turn freely. In certain embodiments, the forming head 40 includes a frusto-conical or cone-shaped region 43 that has a tapered flaring surface and can be introduced into the free end of the tube to be expanded. The flare forming head 40 may be rotatingly and reciprocally disposed in the cylindrical member 131, and penetration of the cone-shaped region 43 into the interior of the tube to be flared results in the deforming of the entire circumference of the free end of the tube to a flared state, and burnishing of the flared end of the tube. Tubes with radially outwardly flared flanges may be thus provided.

Figure 6:
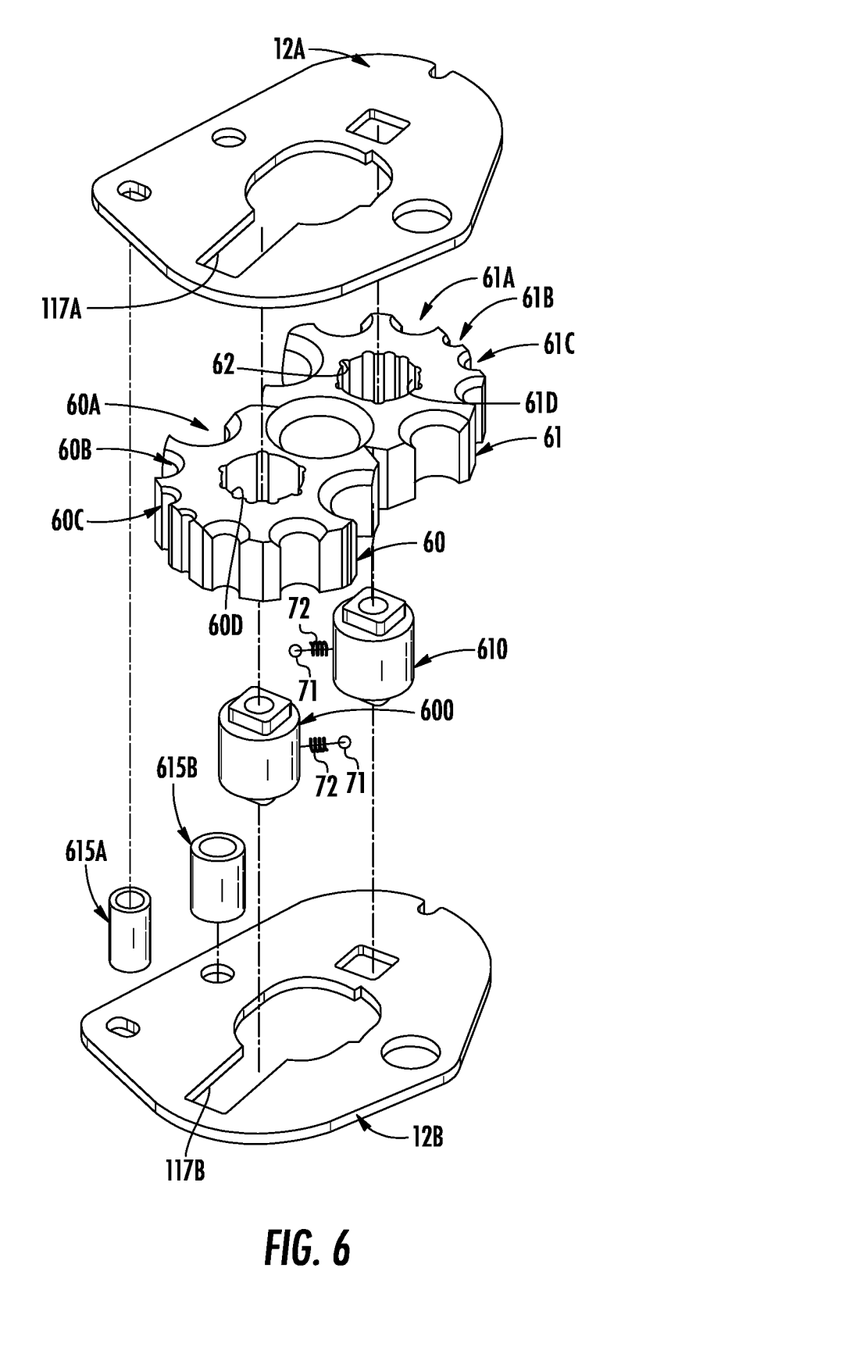
FIG. 6 is an exploded view of a flaring die assembly in accordance with certain embodiments.

Turning now to FIG. 6, there is shown the tube receiving region which includes gripping dies 60, 61 for holding or gripping the tube to be flared during a flaring operation in accordance with certain embodiments. In the embodiment shown, there are a pair of gripping dies 60, 61, each having one or more arc-shaped recesses formed around their outer perimeters. In certain embodiments, the arc-shaped recesses 60A, 60B, 60C, etc. on gripping die 60 are spaced apart and are of different sizes or radiuses. In certain embodiments, similarly spaced and sized recesses 61A, 61B, 61C, etc. are provided on the outer perimeter of gripping die 61. In certain embodiments, the upper region of each of the recesses is beveled or angled as shown, providing an angled flaring surface defining a radial outward taper on which the flare of the tube may be formed. In certain embodiments, each of the recesses on each of the gripping dies is semicircular, and can receive a tube of appropriate outer diameter to be flared. In certain embodiments, the gripping dies 60 and 61 are held between the top and bottom plates 12A, 12B, which may be separated by suitably sized spacers 615A, 615B.

In certain embodiments, the gripping dies 60 and 61 are positioned between top and bottom plates 12A, 12B so that they can be rotated with respect to each other to allow a recess of a particular size or radius on gripping die 60 to be positioned in cooperative relation with the recess of the same size or radius on gripping die 61, such that the two dies cooperate to define a generally cylindrical opening or hole having a diameter that matches the outside diameter of a tube to be flared. Each of the dies 60, 61 can be accessed by the user to be manually moved to the desired position a the space between the top and bottom plates 12A, 12B as seen in FIGS. 1, 2 and 8. Accordingly, in certain embodiments, one or both of the gripping dies 60, 61 can be independently and selectively moved, such as by rotation, so that they cooperate to define an opening for receiving a tube to be flared. In some embodiments, both dies 60 and 61 are rotatable about respective longitudinal central axes. Accordingly, the various different sizes of the recesses in each die, when respectively aligned with a correspondingly sized recess in the other die, cooperate to define a tube opening or hole dimensioned to accommodate different diameter tubes to be flared, e.g., ¼", ⅜", ½", ⅝", etc. diameter tubes. The gripping dies 60 and 61 can be marked with suitable indicia visible to the user to indicate the sizes of the various recesses to facilitate proper alignment of like sized recesses of the two dies.

In certain embodiments, flaring die shaft 600 may support gripping die 60 be the top plate 12A and the bottom plate 12B and allows the gripping die 60 to rotate about a longitudinal axis through the center aperture 60D in gripping die 60. Similarly, flaring die shaft 610 may support gripping die 61 between the top plate 12A and the bottom plate 12B and allows the gripping die 61 to rotate about a longitudinal axis through the center aperture 61D of gripping die 61. In certain embodiments, the center apertures 60D and 61D each have a plurality of spaced axial notches or grooves 62 formed in their perimeter surfaces. The notches or grooves 62 are configured to receive a ball bearing 71 positioned in a respective flaring die shaft 600, 610 that are each biased radially outwardly in the flaring die shaft 600, 610 by a small biasing member or spring 72. This allows each of the dies 60, 61 to index from arc or recess size to arc or recess size, locking the dies in place when the spring-loaded detent ball bearing 71 enters a notch or groove 62, and provide tactile and/or audible indication to the user that the die is properly positioned and held in a locked position.

FIGS. 7A, 7B, 7C, 7D and 7E illustrate an embodiment of the ratchet clutch assembly 100. In certain embodiments, the assembly 100 includes first clutch shaft 22 which is generally cylindrical and may include spaced circumferential recesses 103 on its outer surface. The outer diameter of the first clutch shaft 22, and the spaced circumferential recesses 103, are sized and configured to receive a standard 12 point or ⅜" square drive SAE ratchet wrench for engaging and actuating or driving the first clutch shaft 22. Those skilled in the art will appreciate that the outer diameter of the first clutch shaft 22 and the recesses 103 could be sized and configured to receive a standard 12 point SAFE ratchet wrench, or other similar tool suitable for supplying the mechanical advantage required by the user to provide the necessary torque to actuate the first clutch shaft 22. Alternatively or in addition, the first clutch shaft 22 may include a square aperture 104 formed in its op surface sized and configured to receive a square drive, such as a ⅜ inch square drive on a socket wrench to supply the necessary mechanical advantage.

Figure 7A:
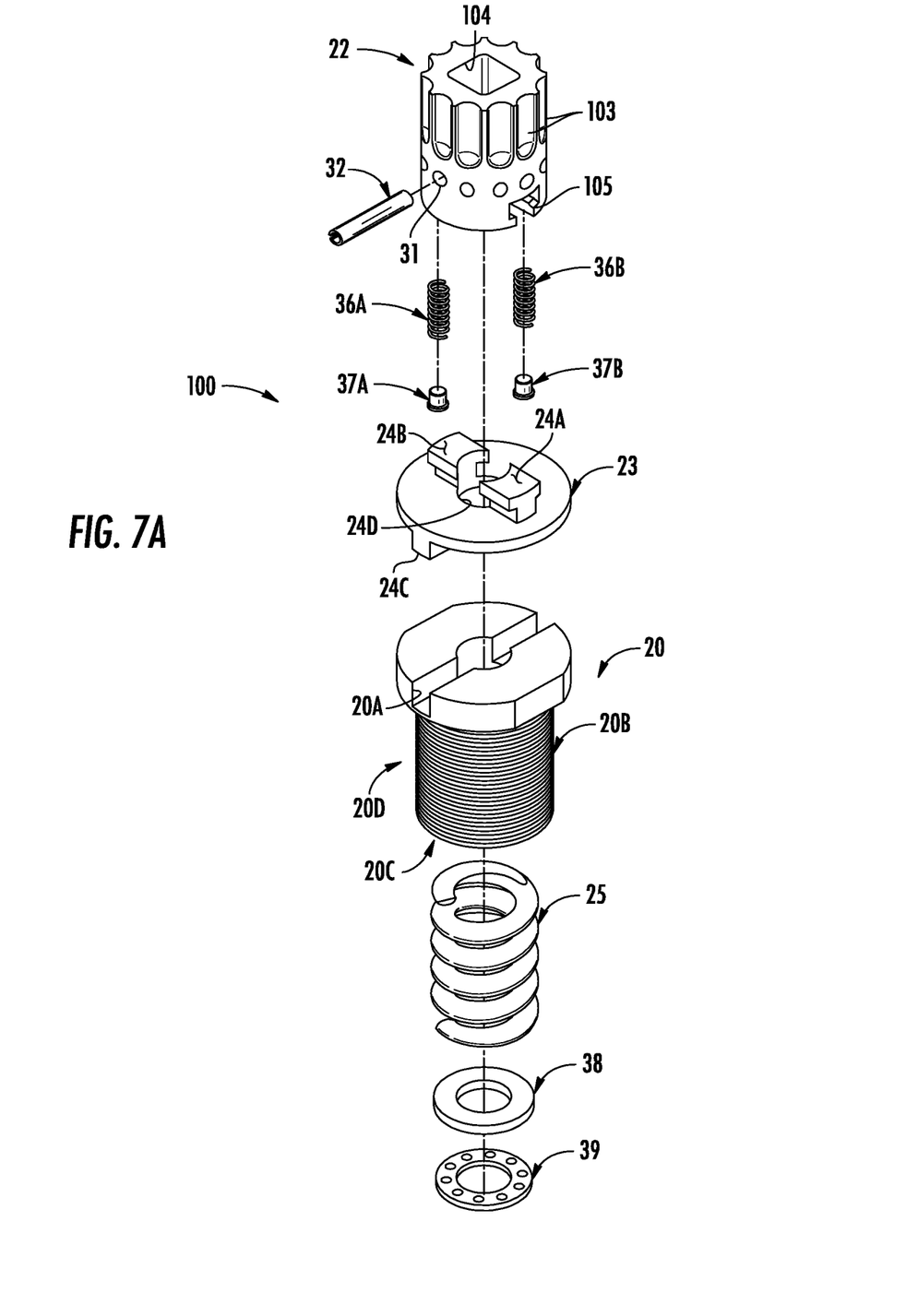
FIG. 7A is an exploded view of a ratchet clutch assembly accordance with certain embodiments.
Figure 7B:
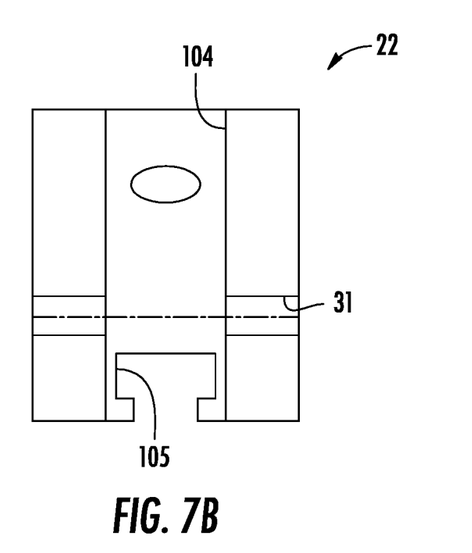
FIG. 7B is a cross-sectional view of a first clutch shaft in accordance with certain embodiments.
Figure 7C:
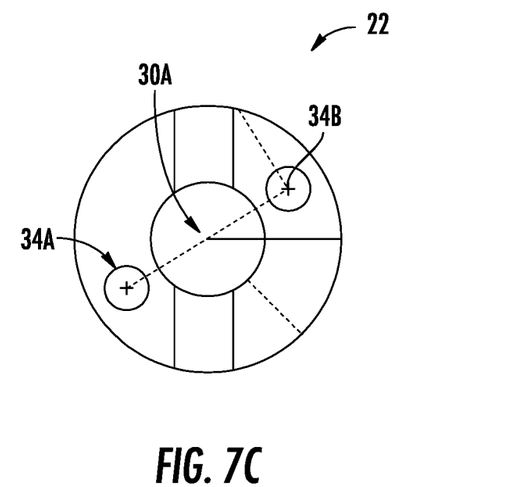
FIG. 7C is a bottom view of the first clutch shaft of FIGS. 7A and 7B.
Figure 7D:
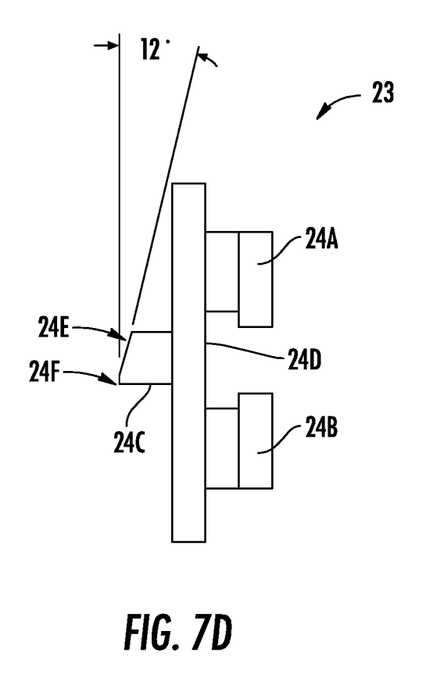
FIG. 7D is a side view of a clutch plate in accordance with certain embodiments.
Figure 7E:
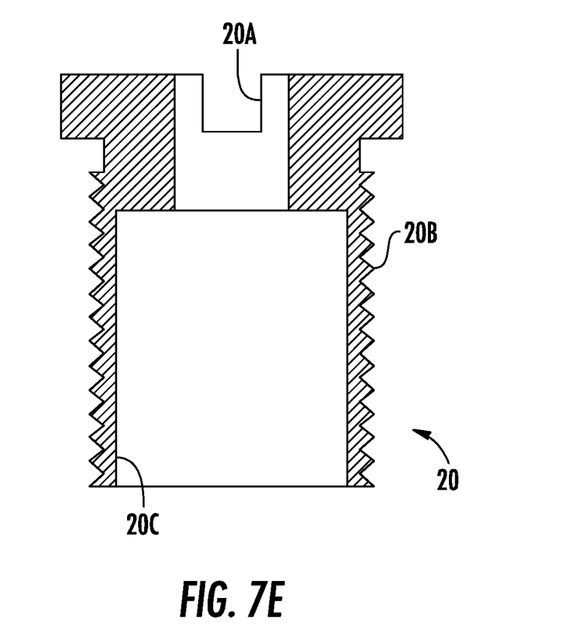
FIG. 7E is a cross-sectional view of a second clutch shaft in accordance with certain embodiments.

In certain embodiments, the first clutch shaft 22 includes a central cylindrical bore 30A (FIG. 7C) sized and configured to receive the flare forming head support shaft 30. A radial slot 31 may be formed in the first clutch shaft 22 to receive a roll pin 32 or the like that is received by a through hole 31 (FIG. 7A) and through hole 31A (FIG. 5A) in the flare forming head support shaft 30 to couple and retain the shaft 30 in place in the bore 30A (FIG. 7C). In some embodiments, the first clutch shaft 22 also includes a pair of spaced axially extending bores 34A, 34B (FIG. 7C) that receive respective biasing members or springs 36A, 36B attached to respective poppets 37A, 37B as best seen in FIG. 7A. The biasing members 36A, 36B function to help disengage the first clutch shaft 22 when the flare operation is complete, and reengage to flare another tube, as discussed in greater detail below. The bottom or underside of the first clutch shaft 22 may include a first female region such as a T-shaped cut-out 105 that is sized and configured to receive a first male region such as axially extending T-shaped protrusions 24A, 24B on clutch plate 23. Clutch plate 23 provides a drive interface between a second clutch shaft 20 and the first clutch shaft 22, and may include a central aperture 24D through which the forming tool support shaft 30 passes, and an axially extending second male region such as an angled engaging radial arm 24C that may be received by with a radial slot 20A in the top face of the second clutch shaft 20 (FIGS. 7D and 75). In certain embodiments, the radial arm 24C is angled, such as an angle of 12° relative to horizontal as shown in FIG. 7D. This angled radial arm thus extends axially downward from the clutch plate 23 a shorter distance at the angled edge 24E than the distance the arm extends axially downward at the opposite edge 24F that is not angled, creating a sloped free end.

In certain embodiments, extending axially from the top of second clutch shaft 20 is a generally cylindrical member 20D that includes external threads 20B that are configured to threadingly engage the internal threads in ring insert 28 (FIG. 3A). The second clutch shaft 20 receives biasing member or spring 25 (FIG. 7A) in internal bore 20C (FIG. 7E) and provides downward force on the forming tool support shaft 30 and flare forming head 40 via the biasing member 25 during a flaring operation. In some embodiments, a small bearing ring 39 positions in the bore 20C that is spaced from biasing member 25 by a washer 38 that provides a flat surface between the biasing member 25 and the small bearing ring 39. The small bearing ring 39 receives the cylindrical member 131 (FIG. 5A) of the forming tool shaft 30 and allows the cylindrical member 131 to turn freely on as the flaring of the tube is carried out. The biasing member 25 is configured to provide sufficient downward force on the flare forming head 40 as the first clutch shaft 22 is actuated by the user in a first direction (e.g., clockwise rotation). As the flaring operation proceeds, continued actuation of the first clutch shaft 22 causes the forming tool support shaft 30, which is attached to the first clutch shaft 22, to urge the clutch plate 23 away from the second clutch shaft 20, against the force of the biasing member 25. The clutch plate 23 is thus gradually urged axially away from the second clutch shaft 20, until the angled edge 24E (FIG. 7D) of the arm 24C escapes the confines of the radial slot 20A in the top face of the second clutch shaft 20, and the clutch plate 23 now rotates freely on or above the top face of the second clutch shaft upon further actuation (e.g., further clockwise rotation) of the first clutch shaft 22, but no longer drives the rotation of the second clutch shaft 20 since it is disengaged therefrom. If the first clutch shaft 22 is then actuated in a second direction opposite the first direction (e.g., in a counter-clockwise rotation direction), the axially longer edge 24F (FIG. 7D) of the arm 24C contacts and catches against the side wall of the radial slot 20A (assisted by biasing members 36A, 36B), thereby reengaging the clutch plate 23 with the second clutch shaft 20, so that the second clutch shaft 20 reaches a fully retracted position to remove the flared tube and prepare to receive another tube to be flared.

Figure 10:
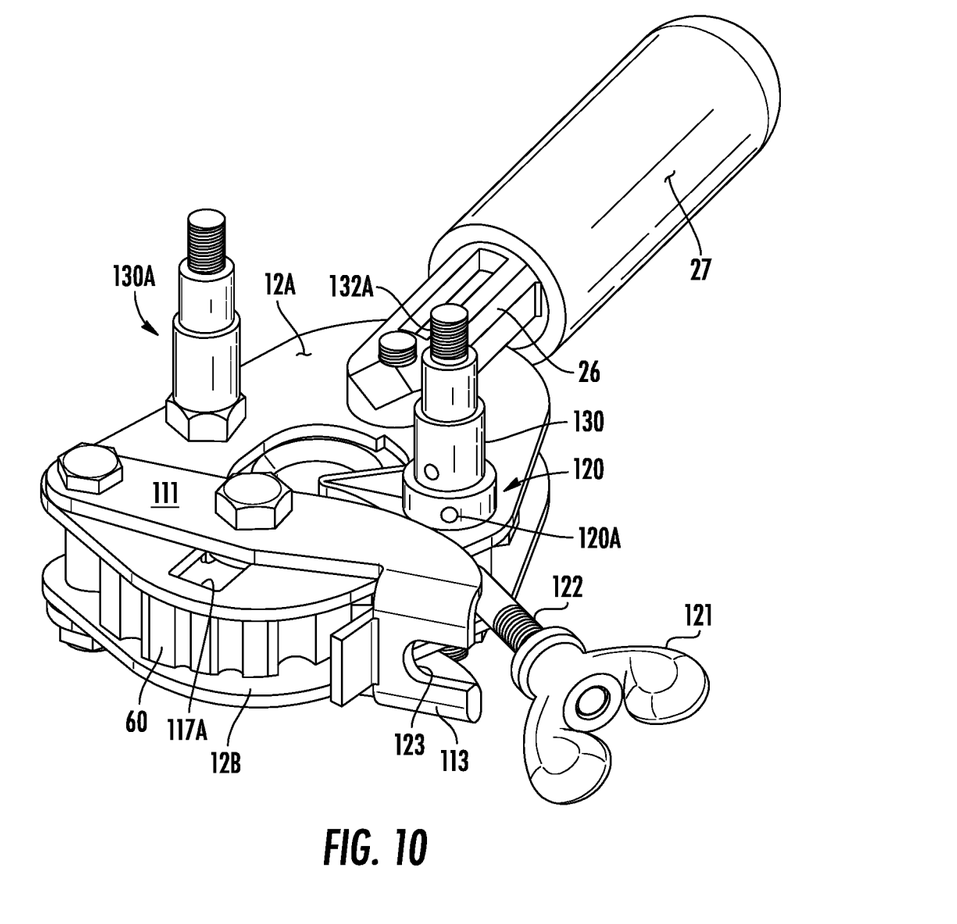
FIG. 10 is a perspective view of a flaring tool with a locking bracket shown in the unlocked closed position in accordance with certain embodiments.
Figure 11A:
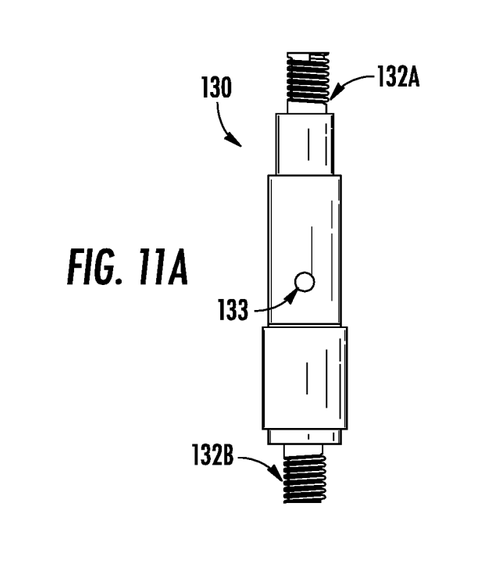
FIG. 11A is a front view of a lock ng bracket support shaft in accordance with certain embodiments.
Figure 11B:
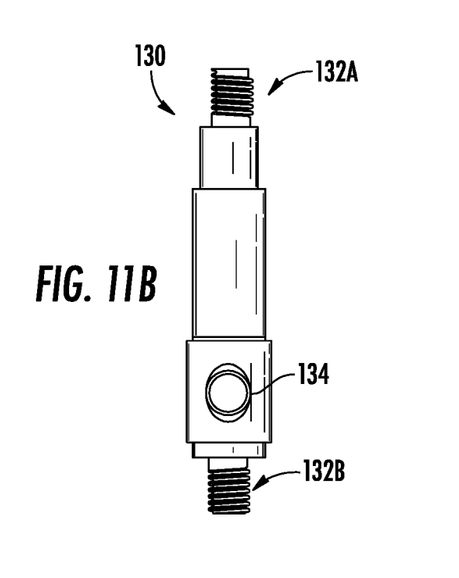
FIG. 11B is a rear view of a locking, bracket support shaft in accordance with certain embodiments.
Figure 12:
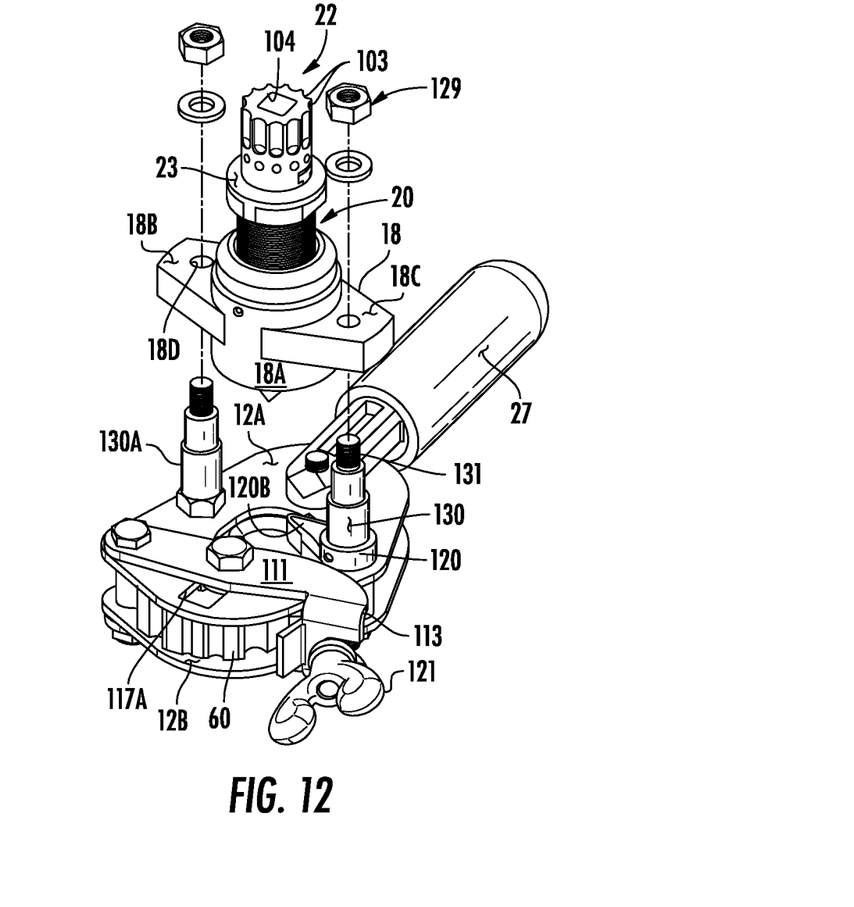
FIG. 12 is an exploded view of a flaring tool with a height guide in an inoperative position in accordance with certain embodiments.

FIGS. 8, 11A and 11B illustrate a support shaft 130 in accordance with certain embodiments. In certain embodiments, the support shaft 130 is an elongated member having a threaded top region 132A and a threaded bottom region 132B. The support shaft 130 passes through the through hole 18F (FIGS. 3A and 3B) and in the support housing 18 and is coupled to the housing 18 such as with nut 129 which engages with the threads on the threaded top 132A. The threads of the threaded bottom 132B of the support shaft 130 are engaged with nut 136 which couples it to the bottom plate 12B. In certain embodiments, a height guide 120 is secured to the support shaft 130, which height guide 120 sits on or just above top plate 12A as can be seen in FIGS. 2 and 10. A roll pin 128 may be used to secure the height guide 120 on the support shaft 130 via hole 120A in the height guide 120 that aligns with hole 133 in the support shaft 130. In some embodiments, the support shaft 130 has a threaded radial aperture 134 that receives a locking shaft 122, which may be threaded, as shown in FIG. 8. The support shaft 130 is rotatable about its longitudinal axis, such as by actuating the locking shaft 122 in a clockwise or counter-clockwise direction, which in turn rotates the height guide 120 between its operative and inoperative positions. The operative position is shown in FIGS. 2 and 10 where the arm 120B of the height guide 120 positions over the circular opening formed by cooperation of the gripping dies 60, 61 and thus creates a physical stop for insertion of the tube to be flared, preventing further axial movement of the tube in the insertion direction. The inoperative position of the height guide 120 is shown in FIGS. 1 and 12 where the arm 120B of the height guide 120 is no longer positioned over the circular opening formed by cooperation of the dies 60, 61.

Figure 9:
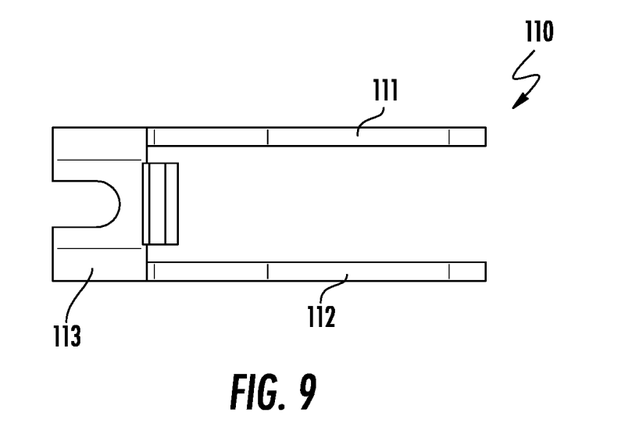
FIG. 9 is a cross-sectional view of a locking bracket in accordance with certain embodiments.

Turning now to FIGS. 8, 9 and 10, a locking bracket 110 is illustrated in accordance with certain embodiments. The locking bracket 110 includes a top leg 111 and a spaced bottom leg 112 and side member 113 connecting them. The locking bracket 110 is generally C-shaped, with the region between the top and bottom legs 111, 112 sufficient to accommodate the top and bottom plates 12A, 12B when they house the dies 60, 61. In certain embodiments, the locking bracket 110 is secured to the top and bottom plates 12A, 12B by a shoulder bolt 114 or the like that passes through aligned through holes in the top leg 111, bottom leg 112 and top and bottom plates 12A, 12B. In certain embodiments, the locking bracket 110 may pivot through spacer 615A (FIG. 6) about the longitudinal axis, defined by the shoulder bolt 114. A second shoulder bolt 115 also passes through aligned through holes in the top leg 111, through the center hole of flaring die shaft 600 (FIG. 6), bottom leg 112 (FIG. 8) and top and bottom plates 12A, 12B, as well as the central aperture 60D (FIG. 6) in the gripping die 60, and rides in slots 117A, 117B in the top plates 12A and bottom plate 12B, respectively, allowing the locking bracket 110 to pivot about the aforementioned longitudinal axis within the slots 117A, 117B.

When the locking bracket 110 is in the unlocked or open position as shown in FIG. 2, it pivots gripping die 60 outwardly and away from gripping die 61, retracting it from its operative gripping position and allowing space to insert the tube to be flared into the tube receiving region. In addition, when the locking bracket 110 is in this open unlocked position, the arm 120B of height guide 120 (FIG. 10) may be pivoted over the bore to be defined by cooperation of the gripping dies 60, 61, providing a stop for the insertion of the tube to be flared, thereby limiting the axial extent to which the tube can be inserted. The height guide 120 thereby sets the appropriate depth to which the tube can be inserted into the receiving region of the tool, in order reproducibly and accurately set the proper depth for flaring of the tube. Once the tube is appropriately positioned and abutting against the arm 120B of the height guide 120, the height guide 120 may be pivoted to its inoperative position, and the locking bracket 110 may be pivoted back to its closed position (FIG. 1), causing the gripping die 60 to contact the tube and, together with gripping die 61, grip or clamp or otherwise secure it in place to prevent axial movement of the tube. The locking bracket 110 may be then locked in this closed position by a fastener such as a wing nut 121 or the like, which threads onto locking shaft 122 when the locking shaft 122 is received by slot 123 (FIGS. 8 and 10) in the locking bracket 110.

In certain embodiments, a second support shaft 130A (FIG. 12) passing through spacer 615B (FIG. 6) may be provided to secure the support housing 18 (FIG. 3A) to the top and bottom plates 12A, 12B as seen in FIGS. 1, 2 and 8.

In accordance with certain embodiments, an expanded or flared tube may be manually formed using the tool as follows. The wing nut 121 may be loosened or removed from the locking shaft 122, and the locking bracket 110 pivoted to its open position shown in FIG. 2. The height guide 120 is placed in its operative position, such as by pivoting the locking shaft 122, to create a physical stop against the over-insertion of a tube into the tool. One or more of the gripping dies 60, 61 are manually moved to the appropriate position (if they are not already in that position) by the user so that they cooperate to define an opening of the proper diameter to receive the tube to be flared. The tube to be flared is inserted in the thus defined opening until a free end of the tube abuts against the stop provided by the height guide 120. The height guide 120 is then moved away from the opening to its retracted (inoperative) position, such as by pivoting the locking shaft 122, and the locking bracket 110 is moved to its locked position (FIG. 1) and secured there with wing nut 121 or other suitable fastener. The movement of the locking bracket 110 to its locked position also moves gripping die 60 to its operative position and secures it there, where it cooperates with gripping die 61 and grips the tube in the opening formed by that cooperation to prevent axial movement of the tube. The first clutch shaft 22 is then actuated, such as by grasping or engaging it with a hand-held 12 point ratchet, or by inserting an appropriately sized square drive into the square aperture 104 (FIG. 7A) formed in the top surface of the first clutch shaft, and rotating the first clutch shaft in a first direction, such as a clockwise direction. This first clutch shaft actuation causes the support shaft 30 that is coupled to the first clutch shaft 22 to rotate, translating the flare forming head 40 axially downward, towards the tube held by the gripping dies 60, 61, as it engages the free end of the tube, forcing it against the flaring surfaces of the gripping dies 60, 61 and causing the tube expand or flare radially outwardly. Due to the angled positioning of the flare forming head 40, it rotates acentrically relative to the longitudinal axis of the tube as it flares the tube, and thereby burnishes the tube as well. As the first clutch shaft 22 continues to be actuated, the forming tool shaft 30 gradually urges the clutch plate 23 (and the first clutch shaft 22) to separate (i.e., in the direction opposite the tube being flared) against the force of the biasing member 25, eventually a distance sufficient to cause the arm 24C of the clutch plate 23 to disengage from the confines of the radial slot 20A of the second clutch shaft, such that the clutch plate 23 no longer drives rotation of the second clutch shaft 20 and instead spins freely on or just above the top face of the second clutch shaft 20. In this position of the tool, the tube can no longer be flared despite further actuation of the first clutch shaft 22 by the user, as the flare forming head 40 no longer is urged with sufficient force into the tube. This confirms to the user that the flaring of the tube is complete, and the tube can be removed from the tool. To remove the flared tube from the tool, the first clutch shaft 22 is rotated in a second direction opposite the first direction, e.g., counter-clockwise, which causes the clutch plate 23 to move axially towards the second clutch shaft 20. As this axial movement continues, the edge 24F of the arm 24C eventually contacts a wall of the radial slot 20A in the second clutch shaft 20. As the second direction rotation continues further, the arm 24C seats in radial slot 20A, thereby re-engaging the clutch plate 23 with the second clutch shaft 20 so that the clutch plate 23 can again drive the second clutch shaft 20 retracting flare forming head 40 until it comes to a complete stop as to not interfere with the arm 120B of the height guide 120. The wing nut 121 may be loosened or removed, and the locking bracket 110 retracted to the open position of FIG. 2, which in turn retracts gripping die 60 from its gripping position, expanding the opening between the two gripping dies 60 and 61 and allowing the flared tube to be removed by the user. The tool is now operative to flare another tube.

While the embodiments described herein include a limited number of embodiments, these specific embodiments are not intended to limit the scope as otherwise described and claimed herein. Modification and variations from the described embodiments exist.

What is claimed is:

1. A tool for flaring the free end of a tube, comprising:
a tube receiving region comprising first and second gripping dies positionable to cooperatively define an opening for receiving a tube;
a first clutch shaft;
a support housing having an internal bore for receiving a second clutch shaft;
a clutch plate providing a drive interface between said first and second clutch shafts;
a flare forming head operable to flare said free end of said tube, said flare forming head having a flare forming head shaft coupled to said first clutch shaft and rotatable in said support housing by actuation of said clutch shaft;
a biasing member urging said flare forming head axially;
wherein said first clutch shaft has an outer configuration adapted to be engaged by a 12 point or ⅜" square drive ratchet wrench for creating mechanical advantage to actuate said flare forming head; and
wherein when the force that said biasing member urges said flare forming head axially is overcome, said clutch plate disengages from said second clutch shaft such that further actuation of said first clutch shaft does not rotate said flare forming head shaft, and prevents further flare forming of the tube.

2. The tool of claim 1, wherein said flare forming head comprises a conically shaped region.

3. The tool of claim 1, wherein said first and second gripping dies are movable in said tube receiving region so as to cooperatively define openings of different diameters.

4. The tool of claim 1, further comprising a height guide actuatable between a first position in which it creates a physical stop for axial insertion of said tube in said opening, and a second position in which it is retracted from said opening.

5. The tool of claim 1, wherein said first and second gripping dries comprise beveled regions providing an angled flaring surface defining a radial outward taper against which the flare of the tube is formed.

6. The tool of claim 1, wherein said first gripping die has at least one semi-circular recess that cooperates with a corresponding semi-circular recess in said second griping die to form a cylindrical opening for receiving said tube.

7. The tool of claim 6, wherein said first gripping die has a plurality of semi-circular recesses having different radiuses, said second gripping die has a plurality of semi-circular recesses having different radiuses, each corresponding to a respective radius of said recesses of said first gripping die, and wherein said first and second gripping dies are movable in said receiving region to position semi-circular recesses of the same radius on each gripping die to cooperatively form said cylindrical opening for receiving said tube.

8. The tool of claim 1, wherein said clutch plate comprises an axially extending angled arm, and said second clutch shaft comprises a radial slot for receiving said axially extending angled arm.

9. The tool of claim 8, wherein when said force that said biasing member urges said flare forming head axially is overcome, said axially extending angled arm moves to a position where it is not received by said radial slot.

* * * * *